US009619027B2

United States Patent
Sodhi et al.

(10) Patent No.: US 9,619,027 B2
(45) Date of Patent: Apr. 11, 2017

(54) USING VORTICES TO PROVIDE TACTILE SENSATIONS CORRESPONDING TO A VISUAL PRESENTATION

(71) Applicant: Disney Enterprises, Inc., Buena Vista, CA (US)

(72) Inventors: Rajinder Sodhi, Champaign, IL (US); Ivan Poupyrev, Pittsburgh, PA (US); Matthew Feld Glisson, Pittsburgh, PA (US)

(73) Assignee: Disney Enterprises, Inc., Burbank, CA (US)

( * ) Notice: Subject to any disclaimer, the term of this patent is extended or adjusted under 35 U.S.C. 154(b) by 522 days.

(21) Appl. No.: 13/941,149

(22) Filed: Jul. 12, 2013

(65) Prior Publication Data
US 2015/0015607 A1 Jan. 15, 2015

(51) Int. Cl.
| | |
|---|---|
| *H04B 3/36* | (2006.01) |
| *G06F 3/01* | (2006.01) |
| *G06F 3/03* | (2006.01) |
| *G06F 3/042* | (2006.01) |
| *F15D 1/00* | (2006.01) |
| *A63F 13/285* | (2014.01) |

(52) U.S. Cl.
CPC .............. *G06F 3/016* (2013.01); *G06F 3/011* (2013.01); *G06F 3/0304* (2013.01); *G06F 3/0425* (2013.01); *A63F 13/285* (2014.09); *F15D 1/009* (2013.01); *F15D 1/0015* (2013.01); *Y10T 137/2087* (2015.04)

(58) Field of Classification Search
CPC ....................................................... G08B 6/00
USPC ..................... 340/436; 345/156; 353/10; 1/1
See application file for complete search history.

(56) References Cited

U.S. PATENT DOCUMENTS

| | | | |
|---|---|---|---|
| 3,050,870 A | 8/1962 | Morton | |
| 7,102,496 B1* | 9/2006 | Ernst et al. ................... 340/436 |
| 8,686,943 B1* | 4/2014 | Rafii ....................... G06F 3/017 345/158 |
| 9,092,953 B1* | 7/2015 | Mortimer et al. | |

(Continued)

OTHER PUBLICATIONS

Azuma, Ronald T., A Survey of Augmented Reality, Presence: Teleoperators and Virtual Environments, vol. 6, 48 pages, Aug. 1997, ACM SIGGRAPH, New York, United States.

(Continued)

*Primary Examiner* — Andrew Bee
*Assistant Examiner* — Israel Daramola
(74) *Attorney, Agent, or Firm* — Patterson + Sheridan, LLP

(57) ABSTRACT

To convey tactile sensations over an open space, a system may use a vortex generator to direct one or more vortices at an object in 3-D space. Once a vortex strikes an object—e.g., a user's hand—it applies a force. The vortex generator can control the frequency and intensity of the vortices in order to provide different tactile sensations that correspond to virtual objects or events in a visual presentation. The system may identify and track objects in the real-world environment, and based on information provided by a device displaying the visual presentation, transmit instructions to the vortex generator to discharge vortices that convey a tactile sensation corresponding to the virtual object or event in the visual presentation. By doing so, the vortices augment the real-world environment to immerse the user in the visual presentation.

19 Claims, 8 Drawing Sheets

(56) References Cited

U.S. PATENT DOCUMENTS

| | | | | |
|---|---|---|---|---|
| 2010/0110384 | A1* | 5/2010 | Maekawa | 353/10 |
| 2010/0245237 | A1* | 9/2010 | Nakamura | 345/156 |

OTHER PUBLICATIONS

Azuma, Ronald et al., Recent Advances in Augmented Reality, IEEE Computer Graphics and Applications, Nov. 2001, vol. 21, Issue 6, pp. 34-47, IEEE, Piscataway, United States.

Bau, Olivier et al., TeslaTouch: electrovibration for touch surfaces, Proceedings of the 23nd annual ACM symposium on User interface software and technology, pp. 283-292, 2010, ACM, New York, United States.

Bau, Olivier et al., REVEL: Tactile Feedback Technology for Augmented Reality, ACM SIGGRAPH 2012 Emerging Technologies, Article No. 17, 11 pages, 2012, ACM, New York, United States.

Bianchi, G. et al., High Precision Augmented Reality Haptics, Proceedings of Eurohaptics, 2006, 9 pages, Paris, France.

Bolanowski, Jr., S.J. et al., Four channels mediate the mechanical aspects of touch, The Journal of the Acoustical Society of America, vol. 84, Issue 5, Nov. 1988, pp. 1680-1694, Acoustical Society of America, Melville, United States.

Harrison, Chris et al., Skinput: Appropriating the Body as an Input Surface, Proceedings of the SIGCHI Conference on Human Factors in Computing Systems, 10 pages, 2010, ACM, New York, United States.

Harrison, Chris et al., OmniTouch: Wearable Multitouch Interaction Everywhere, Proceedings of the 24th annual ACM symposium on User interface software and technology, 10 pages, ACM, New York, United States.

Hoshi, Takayuki, et al., Noncontact Tactile Display Based on Radiation Pressure of Airborne Ultrasound, IEEE Transactions on Haptics, vol. 3, No. 3, Jul. 2010, pp. 155-165, EEE, Piscataway, United States.

Israr, Ali et al., Tactile Brush: Drawing on Skin with a Tactile Grid Display, Proceedings of the SIGCHI Conference on Human Factors in Computing Systems, May 7, 2011, 10 pages, ACM, New York, United States.

Leap Motion, retrieved Nov. 5, 2015, 8 pages, Leap Motion, Inc. <https://www.leapmotion.com/>.

Alexander, Jason et al., Adding Haptic Feedback to Mobile TV, Extended Abstracts on Human Factors in Computing Systems, May 7, 2011, 6 pages, ACM, New York, United States.

Lee, Johnny C. et al., Automatic Projector Calibration with Embedded Light Sensors, Proceedings of the 17th annual ACM symposium on User interface software and technology, 4 pages, Oct. 24, 2004, ACM, New York, United States.

Leek, Marjorie R., Adaptive procedures in psychophysical research, Perception & Psychophysics, Nov. 2001, vol. 63, Issue 8, pp. 1279-1292, Springer Link, New York, United States.

Mohseni, Kamran, Optimal Vortex Ring Formation at the Exit of a Shock Tube: Technical Paper, American Institute of Aeronautics & Astronautics, pp. 1-10, Reston, United States.

Raskar, Ramesh, et at al., The Office of the Future: A Unified Approach to Image-Based Modeling and Spatially Immersive Displays, Proceedings of the 25th annual conference on Computer graphics and interactive techniques, Jul. 24, 1998, pp. 1-10, ACM, New York, United States.

Ruiz, Jaime, et al., User-Defined Motion Gestures for Mobile Interaction, Proceedings of the SIGCHI Conference on Human Factors in Computing Systems, May 7, 2011, 10 pages, ACM, New York, United States.

Sodhi, Rajinder et al., LightGuide: Projected Visualizations for Hand Movement Guidance, Conference on Human Factors in Computing Systems, May 2012, 10 pages, ACM, New York, United States.

Wilson, Andrew D., Using a Depth Camera as a Touch Sensor, International Conference on Interactive Tabletops and Surfaces, Nov. 7, 2010, pp. 69-72, ACM, New York, United States.

Wilson, Andrew D. et al., Combining multiple depth cameras and projectors for interactions on, above and between surfaces, Proceedings of the 23nd annual ACM symposium on User interface software and technology, Oct. 3, 2010, 10 pages, ACM, New York, United States.

Burdea, Grigore C., Haptic Feedback for Virtual Reality, Virtual Reality and Prototyping Workshop, 1999, 11 pages, Springer, Berlin, Germany.

Glezer, Ari, The formation of vortex rings, Dec. 1988, American Institute of Physics, 12 pages, College Park, United States.

Gharib, Morteza et al., A universal time scale for vortex ring formation, Journal of Fluid Mechanics, 1998, vol. 360, pp. 121-140, Cambridge University Press, Cambridge, England.

Israr, Ali et al., Frequency and amplitude discrimination along the kinesthetic-cutaneous continuum in the presence of masking stimuli, Acoustical Society of America, Nov. 2006, 12 pages, Melville, United States.

Jones, Brett R. et al., Build Your World and Play in it: Interacting with Surface Particles on Complex Objects, International Symposium on Mixed and Augmented Reality, Oct. 2010, pp. 165-174, IEEE, Piscataway, United States.

Jones, Brett et al., Around Device Interaction for Multiscale Navigation, pp. 83-92, Proceedings of the 14th International conference on Human-computer interaction with mobile devices and services, Sep. 21, 2012, ACM, New York, United States.

Rice, Mark et al., Evaluating Gesture-based Games with Older Adults on a Large Screen Display, Special Interest Group on Computer Graphics and Interactive Techniques, Aug. 10, 2011, pp. 17-24, ACM, New York, United States.

Rogers, W.B., On the formation of rotating rings by air and liquids under certain conditions of discharge, American Journal of science and arts, Second Series, vol. 26, Nov. 1858, pp. 246-247, New Haven, Connecticut.

Rosenfeld, Moshe, et al., Circulation and Formation Number of Laminar Vortex Rings. Numerical Simulations., Journal of Fluid Mechanics, vol. 376, Dec. 1998, pp. 289-291, Cambridge, England.

Russell, R. Andrew, Air vortex ring communication between mobile robots, Robotics and Autonomous Systems, vol. 59, Issue 2, Feb. 2011, 9 pages, North-Holland Publishing Co., Amsterdam, The Netherlands.

Shariff, Karim, Vortex Rings, Annual Review of Fluid Mechanics, vol. 24, Jan. 1992, pp. 235-279, Annual Reviews, Palo Alto, United States.

Suzuki, Yuriko et al., Air Jet Driven Force Feedback in Virtual Reality, IEEE Computer Graphics and Applications, vol. 25, Issue 1, Jan. 2005, 4 pages, IEEE, Piscataway, United States.

Tokuda, Yutaka et al., Cloud Display, Proceedings of the 7th International Conference on Advances in Computer Entertainment Technology, pp. 32-35, Nov. 17, 2010, ACM, New York, United States.

Woodward, Charles et al., CamBall—Augmented Networked Table Tennis Played with Real Rackets, Proceedings of the 2004 ACM SIGCHI International Conference on Advances in computer entertainment technology, Sep. 2, 2004, 2 pages, ACM, New York, United States.

Yanagida, Yasuyuki, et al., Projection-Based Olfactory Display with Nose Tracking, Proceedings of the IEEE Virtual Reality, Mar. 27, 2004, 8 pages, IEEE, Washington, DC, United States.

Microsoft Surface 2.0, 2016, 7 pages, retrieved Jan. 13, 2016, <http://www.microsoft.com/en-us/pixelsense/>.

Kinect for Xbox One, Microsoft, 6 pages, retrieved Jan. 13, 2016, <http://www.xbox.com/en-US/xbox-one/accessories/kinect-for-xbox-one>.

Iwamoto, Takayuki et al., Non-contact Method for Producing Tactile Sensation Using Airborne Ultrasound, Proceedings of the 6th international conference on Haptics: Perception, Devices and Scenarios, Jun. 10, 2008, 10 pages, Springer-Verlag, Berlin, Germany.

Sherrick, C., Generation and Perception of Vibratory Patterns, The Psychology of Touch, p. 191, Sep. 1, 1991, Lawrence Erlbaum Associates, Inc. Publishers, Hillsdale, United States.

(56) References Cited

OTHER PUBLICATIONS

Gupta, Sidhant et al., AirWave: Non-Contact Haptic Feedback Using Air Vortex Rings, Technical Report No. UW-CSE-13-05-02, Proceedings of the 2013 ACM international joint conference on Pervasive and ubiquitous computing, Sep. 8, 2013, 10 pages, ACM, New York, United States.

* cited by examiner

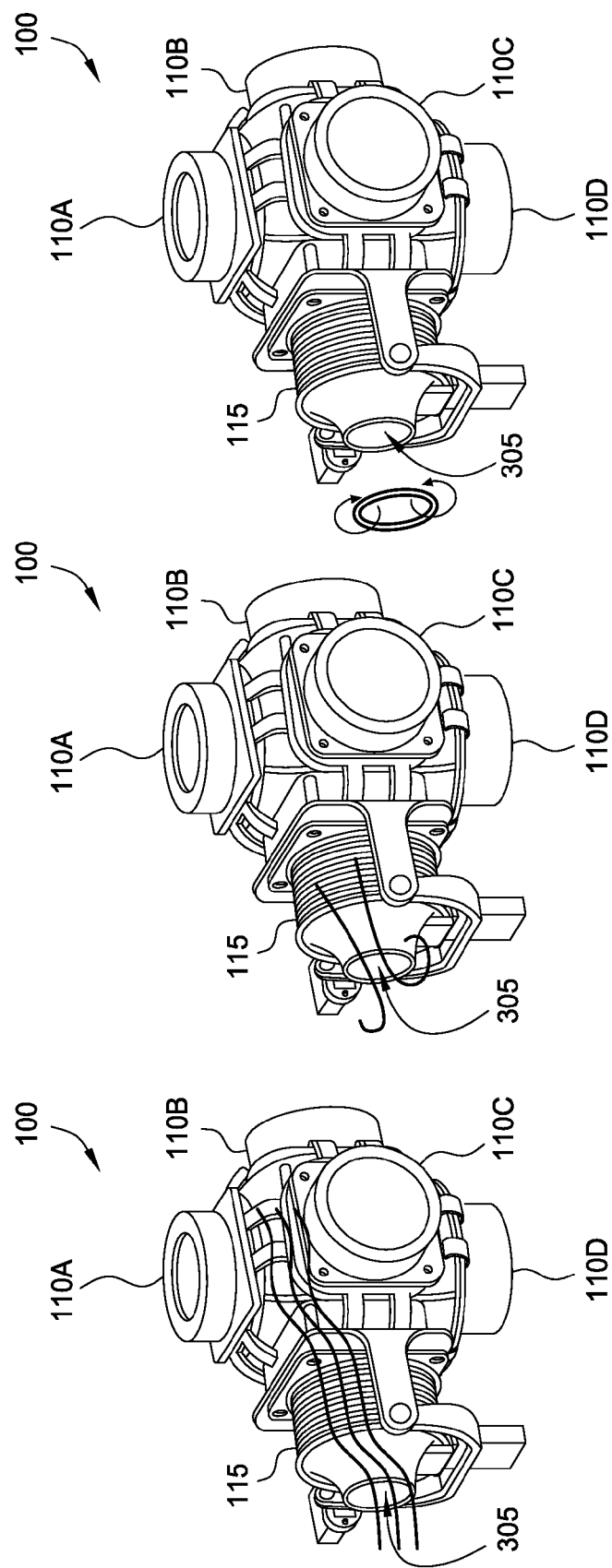

USING VORTICES TO PROVIDE TACTILE SENSATIONS CORRESPONDING TO A VISUAL PRESENTATION

BACKGROUND

Field of the Invention

Embodiments presented in this disclosure relate to generating a vortex to provide tactile sensation, and more specifically, to provide a tactile sensation corresponding to an object or event in a visual presentation.

Description of the Related Art

Tactile (or haptic) feedback has evolved to provide a user with various tactile sensations. In many applications, tactile feedback is used to further immerse a user in a virtual environment or visual presentation. That is, tactile feedback may be used to create an augmented reality where the events occurring in the visual presentation (e.g., a video game, movie, television program, and the like) physically affect the real world.

Tactile feedback may be provided using vibration, force, motion to the user, electromechanical systems, and the like. For example, a game controller may include a vibration system for simulating when the user has driven off the road when playing a driving simulator. Other feedback techniques may rely on providing tactile feedback across an open space. In one example, a tactile feedback system may use a jet or column of air to simulate riding in a convertible or flying in a hang glider. Recently, ultrasound has also been used to provide feedback by issuing sounds waves that constructively interfere at points where tactile feedback is desired—e.g., on a user's hand. However, using jets of air or ultrasound does not convey tactile sensations accurately at long distances—e.g., more than a meter. For example, the user may have to be less than a meter away from the ultrasound emitter in order for the user to feel the tactile sensation. In addition, using a jet of air may not provide the desired resolution for providing the tactile feedback at a specific point. A jet of air begins to disperse just a few millimeters after leaving a confined area such as a nozzle. Thus, if the system is attempting to simulate tactile feedback at only a small location—e.g., a portion of the user's hand that is only a few square centimeters—the jet of air may be incapable of focusing on the small area. Accordingly, these techniques have limitations that reduce their effectiveness for many applications where a tactile sensation is transmitted over a distance.

SUMMARY

Embodiments presented herein include a method and a computer program product for augmenting reality based on a visual presentation. The method and program product include identifying the location of a physical object based on data captured from a sensing device and orienting a vortex generator based on the identified location of the physical object. The method and program product include determining a tactile sensation corresponding to at least one of a virtual object in the visual presentation and an event in the visual presentation, and after orienting the vortex generator, discharging at least one vortex from the vortex generator. The vortex is discharged with physical attributes to provide the tactile sensation corresponding to the visual presentation upon striking the physical object.

Another embodiment presented herein includes a system including a sensing device and a vortex generator where the generator includes adjusters configured to change an orientation of the vortex generator. The system also includes a computing device communicatively coupled to the sensing device and the vortex generator. The computing device is configured to identify the location of a physical object based on data captured from the sensing device and orient the vortex generator based on the identified location of the physical object. The computing device is also configured to determine a tactile sensation corresponding to at least one of a virtual object in the visual presentation and an event in the visual presentation, and after orienting the vortex generator, discharge at least one vortex from the vortex generator. The vortex is discharged with physical attributes to provide the tactile sensation corresponding to the visual presentation upon striking the physical object.

Another embodiment presented herein is a vortex generator. The vortex generator includes a body enclosing a central cavity and an actuator mounted onto the body where the actuator is configured to change the volume of the central cavity in response to a first control signal. The vortex generator also includes a flexible, elongated nozzle attached to the body at a first end, where, in response to the actuator changing the volume of the central cavity, air flows through the nozzle and generates a vortex at a second end of the nozzle opposite the first end. The vortex generator includes an adjustment element coupled to the nozzle. The adjustment element is configured to, in response to a second control signal, adjust the position of the second end of the nozzle relative to the first end of the nozzle thereby changing the direction the vortex travels.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

FIGS. 3A-3C illustrate creating vortices using the vortex generator 100, according to embodiments described herein.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1B:
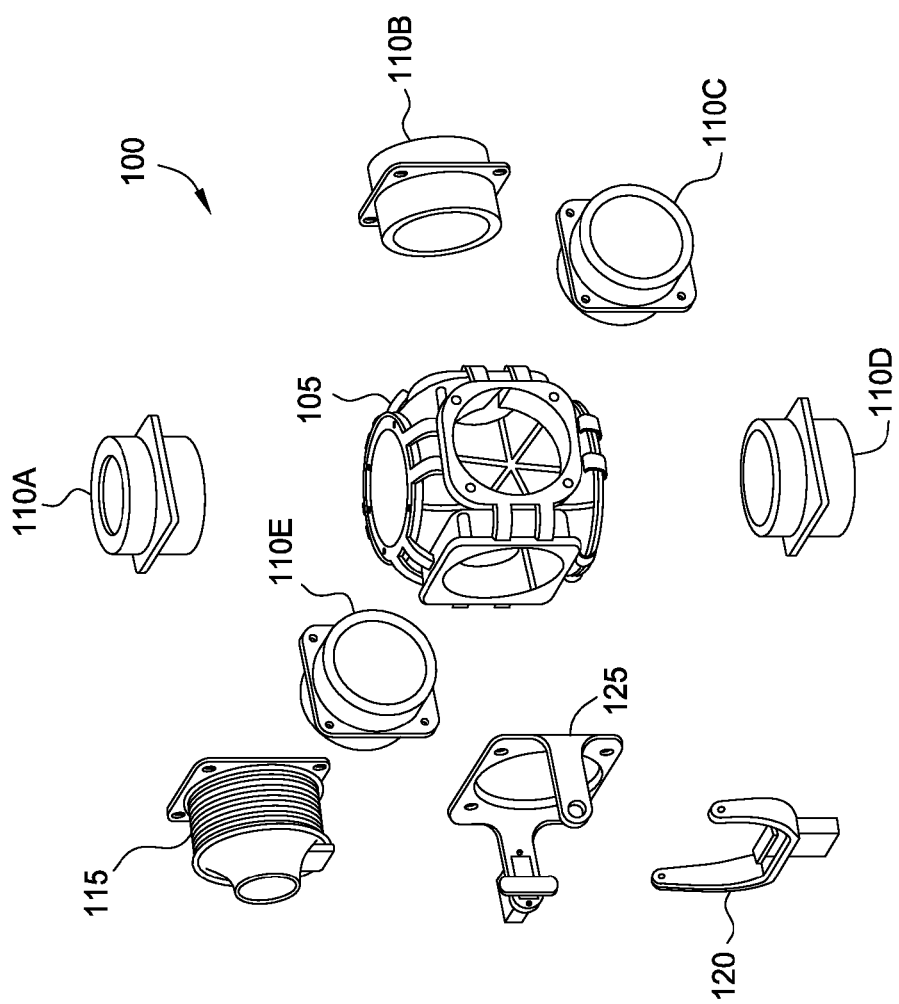
FIGS. 1A-1B illustrate a vortex generator, according to embodiments described herein.

To convey tactile sensations over an open space, a system may use a vortex generator to direct one or more vortices at an object in 3-D space. As used herein, a vortex is a ring (or torus) of air that travels through space. Once the vortex strikes an object—e.g., a user's hand—it applies a force. The vortex generator can control the frequency and intensity of the vortices in order to provide different tactile sensations that correspond to a visual presentation. The vortices may augment the real-world environment to immerse the user in the visual presentation. For example, the visual presentation may be a movie or a video game where the affects of an explosion are transferred to the real-world environment by the vortices hitting the user or other physical objects around the user. In another example, the vortex generator may change the frequency or intensity of the vortices to provide different tactile sensations. Depending on the location of the user's hand in front of a display screen, the vortex generator may produce vortices that convey a different sensation. For example, if the user's hand is over a portion of a screen displaying water, the vortices may provide a feeling of dampness, but if the hand is over a portion of the display screen displaying a rocky surface, the vortex may change the frequency or intensity at which the vortices are discharged to convey a bumpy feeling.

The vortex generator may include a flexible nozzle with one or more gimbal controls that enable the generator to discharge a vortex at a particular 3-D location in space. A controller may synchronize the vortex generator to the visual presentation such that the vortex reaches the object at the same time a particular event occurs in the visual presentation. That is, the controller may account for the delay needed for the vortex to travel to the desired location. As such, the controller may receive data from a tracking application that uses one or more cameras to track the location of the object in order to accurately aim the nozzle of the vortex generator and determine the time required for a vortex to reach the object. In this manner, the vortex generator may be synchronized to a visual presentation in order to provide tactile feedback.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and block diagrams of methods, apparatus (systems) and computer program products according to embodiments of the invention. It will be understood that each block of the flowchart illustrations and block diagrams, and combinations of blocks in the flowchart illustrations and block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and block diagram block or blocks.

Figure 1A:
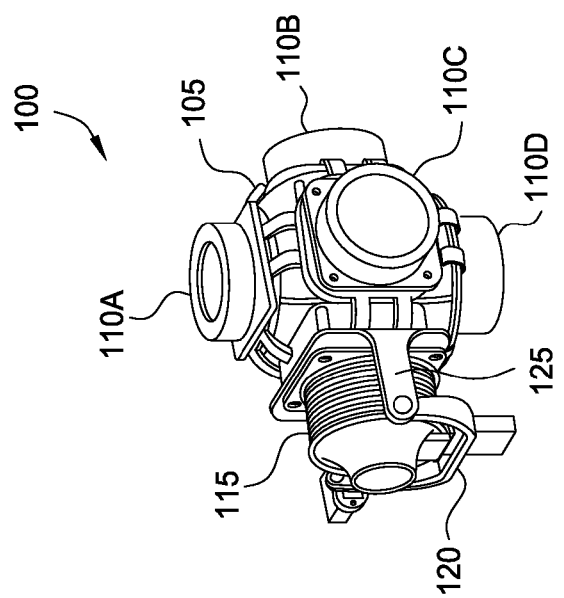

FIGS. 1A-1B illustrate a vortex generator 100, according to embodiments described herein. Specifically, FIG. 1A illustrates an assembled vortex generator 100 while FIG. 1B illustrates an exploded view of the different components in the generator 100. As shown, vortex generator 100 includes a body 105 that forms a hollow enclosure or cavity. FIG. 1B illustrates that the body 105 includes six apertures for attaching various components to the body 105. The six apertures may be spaced equidistantly from each other. Here, each of the six apertures are located on a respective side of a substantially rectangular body 105. Five of the six apertures—i.e., the front, back, right, top, and back apertures relative to the view shown in FIG. 1B—are used for attaching actuators 110A-D to the body 105. These actuators 110A-D may be any component that, when controlled, cause the volume of the hollow enclosure defined by the body 105 to change. The shape of the enclosure is not limited to any particular design and may be spherical, rectangular, and the like. In one embodiment, the actuators 110A-D are sound speakers that include diaphragms that may be actuated by respective control signals. Although five actuators 110 are shown, the vortex generator 100 may include any number of actuators.

If multiple actuators 110 are used, the control signals driving the actuators 110 may be synchronized such that the diaphragms work in tandem to compress the air in the enclosure defined by the body 105 which effectively reduces the volume of the enclosure. That is, the actuators 110 are in fluid communication with one another through the interior volume of body 105 such that two or more of the actuators 110 may work synchronously to alter the volume of the enclosure. Doing so forces air through the remaining aperture. As shown here, this aperture is coupled to a tube or nozzle 115 which is designed to generate a vortex at an output that is opposite of the end coupled to the body 105. Although the body 105 of vortex generator 100 has only one nozzle 115 for discharging a vortex, the present disclosure is not limited to such. In other embodiments, a vortex generator may have a plurality of apertures coupled to respective nozzles for generating vortices simultaneously. A more detailed explanation of generating the vortex will be discussed later.

In one embodiment, the nozzle 115 may be flexible as a result of the particular design of the nozzle 115 or the material used to make the nozzle 115. Here, nozzle 115 is ribbed which provides freedom for the tip of the nozzle 115 to be moved in various directions. Additionally or alternatively, nozzle 115 may be made of a flexible material (e.g., rubber). Vortex generator 100 also includes gimbal controllers 120 and 125 for adjusting the output of the flexible nozzle 115 to point in a specific direction. Specifically, the controllers include a pan controller 125 and a tilt controller 120. By adjusting these controllers 120, 125, the vortex generator 100 can direct a vortex at specific object, even if that object changes locations. In one embodiment, the body 105 may remain stationary while the pan and tilt controllers 120 and 125 move the nozzle 115 in the desired direction. Advantageously, changing the position of the tip of the nozzle 115 while keeping the rest of the vortex generator 100 fixed may improve the accuracy and responsiveness of the generator 100 to change the direction in which vortices are discharged. That is, moving only the nozzle 115 generates less momentum relative to moving the entire vortex generator 100. As such, the accuracy of the vortices may be increased since the controllers 120, 125 do not have to move other components in the generator 100 (e.g., the body 105 and actuators 110A-D). Also, the responsiveness of the vortex generator 100 to an instruction to change the direction at which vortices are discharged may be increased since the controllers 120 and 125 only have to overcome the inertia of the nozzle 115 rather than the inertia of other components in the generator 100.

The dimensions of the vortex generator 100 may vary depending on the applications for which it is used. For example, the size of enclosure defined by the body 105 and the size of the actuators 110A-D of a vortex generator 100 used to provide tactile sensation to a user who is less than a meter away may be smaller than the corresponding components in a vortex generator 100 that discharges vortices at objects that are further away. In one embodiment, the body 105 may be 3-D printed which provides greater flexibility when designing the vortex generator 100 for a particular application. Furthermore, the length or flexibility of the nozzle 115 may vary depending on the desired range of possible directions for discharging the vortices. In one embodiment, the width, length, and height of the body 105 may be as small as 1 cm and as large as a couple of meters. As the dimensions of the body 105 change, this may enable adding larger actuators 110 that may displace more air, and thus, generate more intense vortices.

Figure 2E:
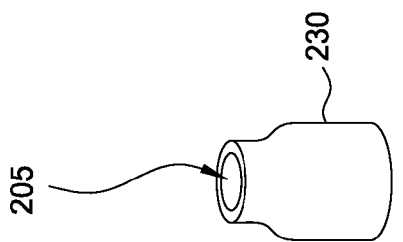
FIGS. 2A-2E illustrate various nozzle shapes, according to embodiments described herein.
Figure 2D:
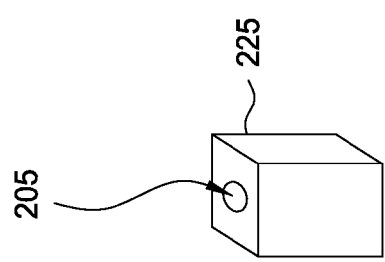
Figure 2C:
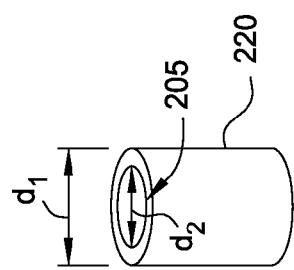
Figure 2B:
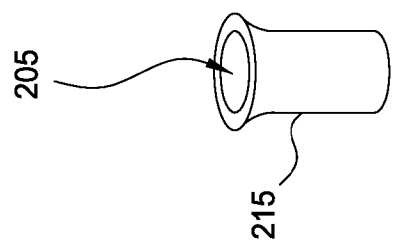
Figure 2A:
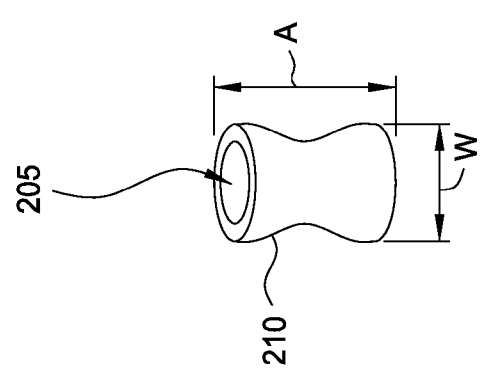

FIGS. 2A-2E illustrate various nozzle 115 shapes, according to embodiments described herein. FIG. 2A illustrates a nozzle 210 that has an hour glass shape where the diameter of the nozzle 210 constricts and then expands along the nozzle's length. Aperture 205 illustrates the output end (or tip) of the nozzle 210 that discharges the vortex. The width (W) and length (L) of nozzle 210 may be varied to generate any desired W/L ratio. For example, in some applications it may be advantageous to have a greater length than width or vice versa. Moreover, the diameter of aperture 205 and the width at the narrowest point of nozzle 210 may be adjusted to exaggerate or minimize the hour glass shape.

FIG. 2B illustrates a nozzle 215 with a flare shape. Here, nozzle 215 has a cylindrical shape for at least some portion of its length but begins to flare near the aperture 205. The diameter of aperture 205, the angle of the flare, and the ratio between the lengths of the cylindrical portion and the flared portion of nozzle 215 may be adjusted as desired.

FIG. 2C illustrates a nozzle 220 that has a cylindrical shape. Unlike nozzle 215, nozzle 220 is cylindrical for its entire length. However, the diameter at the output of the nozzle ($d_1$) may be designed independently of the diameter of the aperture 205 ($d_2$). For example, changing diameter d2 may change the accuracy and size of the discharged vortices while diameter d1 may not affect the characteristics of the discharged vortices. In one embodiment, a suitable value of the diameter d2 may range from 1.0 cm to 5 cm and more specifically from 1.5 cm to 2.5 cm.

FIG. 2D illustrates the more general concept that a nozzle 225 does not need to be cylindrical. Like nozzle 220, nozzle 225 has a shape whose dimensions do not change relative to the length; however, instead of being cylindrical, nozzle 220 is rectangular. In other examples, the nozzle may have other shapes such as a triangle, hexagon, and the like. Regardless of the shape, nozzle 225 may still include the circular aperture 205 which creates the ringed vortices discussed above. Furthermore, nozzle 225 may be flexible so that the direction of propagation of the discharged vortices can be altered.

FIG. 2E illustrates a funnel-shaped nozzle 230 which includes a neck portion that narrows and terminates at the aperture 205. In one example, the inner surface of nozzle 230 may also create this funnel shape such that the air flowing from the body of the vortex generator to the aperture 205 is compressed before exiting the nozzle 230. Experimental data has shown that a vortex generator with an 8 cm×8 cm×8 cm body 105 and a 4 cm long nozzle 230 can achieve an 8.5 cm resolution at 1 meter. That is, at a distance of 1 meter, nozzle 230 can discharge vortices that strike a circular area with a diameter of 8.5 cm at a high accuracy rate—e.g., greater than 90% accuracy rate. For all the nozzles shown in FIGS. 2A-2E, the diameter of the aperture 205 may be changed in order to vary the accuracy and the force applied by the vortex when it strikes an object.

In one embodiment, the nozzles shown in FIGS. 2A-2E may have a design that further increases their flexibility—i.e., the ability of the nozzles to flex relative to the body of the vortex generator. For example, the nozzles may be ribbed as shown by nozzle 115 in FIG. 1.

FIGS. 3A-3C illustrate creating vortices using the vortex generator 100, according to one embodiment described herein. As shown, FIG. 3A illustrates that air may flow from the nozzle 115 into the enclosure defined by body 105 and vice versa. The output of nozzle 115 forms an aperture 305 through which air from inside the vortex generator 100 can flow into the outside atmosphere. FIG. 3B illustrates the airflow generated when the one or more of the actuators 110A-D compress the air enclosed by body 105. Here, decreasing the volume of the enclosure forces air through the nozzle 115 and out of aperture 305. As air is quickly pushed out of the circular aperture 305, the drag from the air molecules near the surface of the nozzle 115 cause the air molecular at the center of aperture 305 to move faster than the air molecules exiting the aperture 305 near the edge of the nozzle 115. This difference in speed causes the air to rotate around the aperture 305 (i.e., from the center of the aperture 305 to the edge of the aperture 305 near the nozzle 115). This rotating ring or vortex of air continues to gain additional air molecules as more air is forced out of the generator 100.

As shown by FIG. 3C, when the vortex of rotating air becomes too large, the ring pinches-off from the output of the nozzle 115 and uses the rotation motion of the air molecules to carry the vortex through space. That is, the rotation of the molecules in the vortex pulls the vortex forward. Moreover, this rotation motion minimizes the energy lost due to friction and allows the vortex to remain stable—maintain its ring form—over long distances (e.g., greater than 3 meters). The rotation of the molecules also creates a region in the middle of the vortex which has a lower pressure than the pressure of the ambient air through which the vortex travels. Once the vortex strikes an object—e.g., a user's hand—the rotation motion breaks down and ambient air rushes in to equalize the pressure. The force associated with this equalization is what generates the tactile sensation felt by the user.

Figure 4:
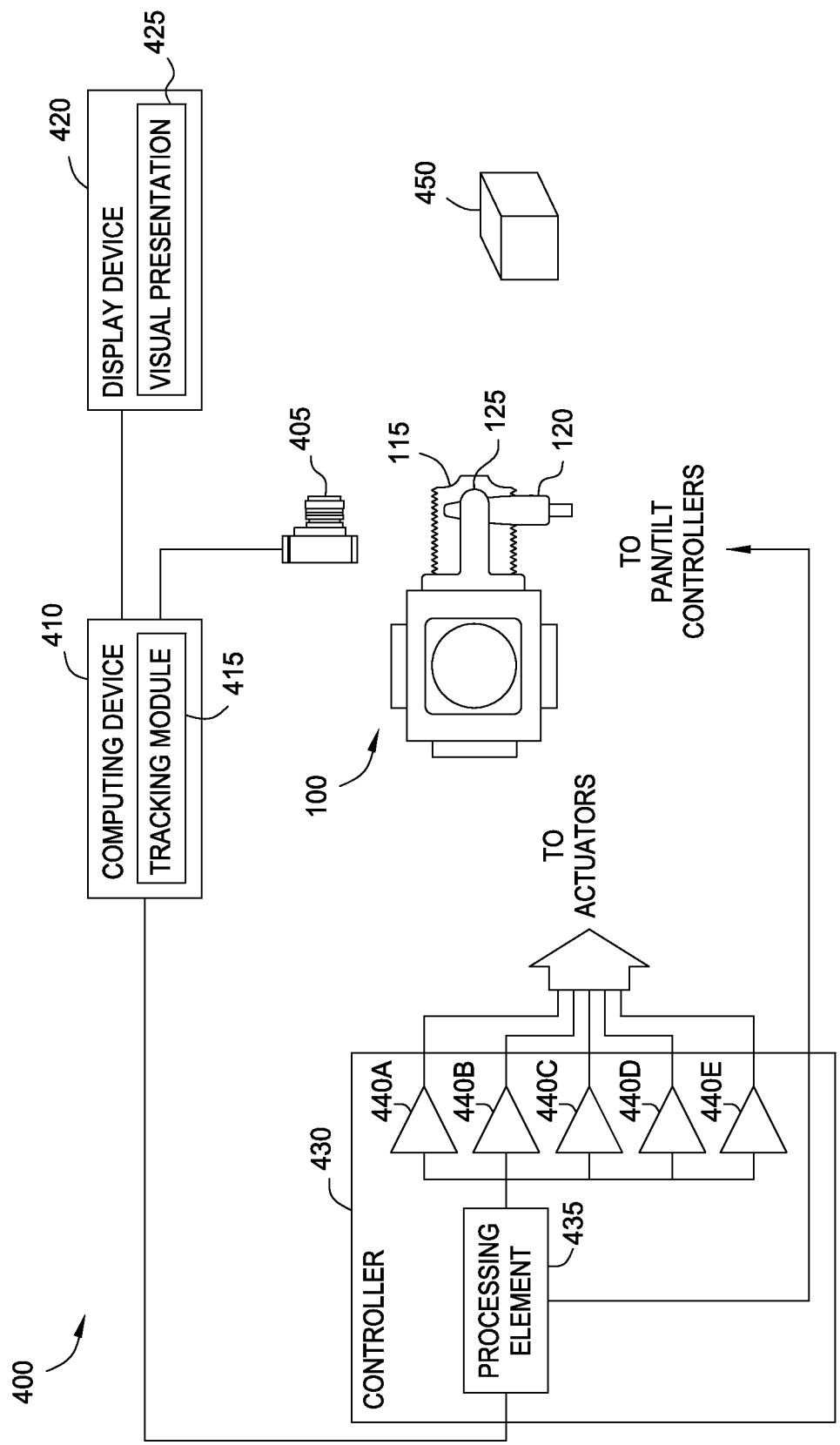
FIG. 4 illustrates a system for using vortices for providing tactile sensations associated with a visual presentation, according to one embodiment described herein.

FIG. 4 illustrates a system 400 for using vortices for providing tactile sensations associated with a visual presentation, according to one embodiment described herein. System 400 includes vortex generator 100, controller 430, computing device 410, and display device 420. To accurately aim nozzle 115 of generator 100 at an object 450 in 3-D space, the controller 430 provides control signals to the pan and tilt controllers 120 and 125 which flex the nozzle 115 in the direction of the object 450. To generate the control signals, the computing device 410 includes a camera 405 which determines a location of the object 450 relative to the vortex generator 100. Although a camera is specifically illustrated herein, any sensing device capable of providing data for determining the spatial location of an object (e.g., depth sensor, IR sensor, LIDAR, visible light camera, charge coupled device, etc.) is within the scope of this disclosure. In one embodiment, the sensing device is a depth camera (e.g., a range-estimation sensor) that measures the distance between camera 405 and the different objects in the camera's view. However, in other embodiments, the sensing device may be a sensor that detects other types of electromagnetic radiation such as visible light. The camera 405 may be mounted onto the body of the vortex generator 100. In this manner, the relationship between the orientation of the generator 100 and camera 405 is fixed. Thus, if the vortex generator 100 moves, the camera can still accurately provide a location of the object 450 relative to the generator 100. In one embodiment, the camera 405 may be calibrated in order to correlate locations in the image captured by the camera 405 to respective values for the pan and tilt controllers 120 and 125.

Computing device 410 includes a tracking module 415 that uses the data provided by camera 405 to track object 450. Tracking module 415 may use an object detection algorithm to identify a particular object 450 (e.g., a face or hand) from other objects in the camera's view. In other embodiments, the object detection algorithm may use the data provided by camera 405 to identify specific gestures made by the user. After identifying a particular object 450 or gesture, tracking module 415 determines the 3D location of the object 450 relative to the vortex generator 100. Based on this location, the tracking module 415 may select pan and tilt control values that cause the pan and tilt controllers 120 and 125 to point the nozzle 115 at the object's location in 3D space. These values are transmitted to a processing element 435 in controller 430 which drives the gimbal controllers 120 and 125 based on these values. Although FIG. 4 illustrates a single computing device 410, in other embodiments the computing device 410 may include multiple individual computing devices that are communicatively coupled in order to perform the embodiments discussed herein.

In addition to providing pan and tilt control signals, the tracking module 415 may provide actuator control signals for synchronizing the vortex generator to a visual presentation 425 outputted by a display device 420. As shown, the computing device 410 is communicatively coupled to the display device 420 that outputs the visual presentation. The display device 420 may be a television, projector, monitor, display screen with an integrated touch sensor, or other display source for outputting a visual presentation. For example, object 450 may be a user viewing the presentation 425 on the display device 420. Based on synchronization data transmitted by the display device 420, the tracking module 415 may send instructions to the controller 430 that cause the vortex generator 100 to output vortices that correspond to a virtual object or event in the visual presentation. The display device 420 transmits information associated with the virtual object or the event—e.g., a description of the virtual object or event or the time the event occurs in the visual presentation 425—to the computing device 410. The tracking module 415 may then generate control signals that cause the vortex generator 100 to discharge a vortex that corresponds to the virtual object or event. Based on the control signals, processing element 435 drives the actuators (e.g., speaks) using the amplifiers 440A-E to generate the desired vortex. For example, the processing element 435 may generate a low-intensity vortex if the event in the visual presentation 425 is a soft breeze but a high-intensity vortex if the event is an explosion.

In one embodiment, the processing element 435 may control the frequency and intensity of the vortices to produce different tactile sensations at the object 450—e.g., a user. For example, by varying the frequency and intensity, the vortices may simulate different textures corresponding to different virtual objects in the visual presentation such as sand, stones, grass, water, ridged structures, glass and the like. In this manner, the stickiness, roughness, slipperiness, etc. of the virtual objects displayed in the visual presentation 425 may be conveyed to the physical object 450. Here, the display device 420 may inform the computing device 410 what type of virtual object is (or will be) displayed in the visual presentation 425. If the user interacts with the virtual object (as detected by the tracking module using the sensor 405), the computing device may instruct the controller 430 to direct the corresponding texture of the virtual object to the user. For example, by varying the frequency at which the vortices are discharged (e.g., 1-30 Hz) and the intensity of the vortices (e.g., driving the actuators with varying voltages), system 400 may deliver different tactile sensations. However, these sensations may vary depending on the user—i.e., the sensations are subjective. For example, discharges vortices at 5 Hz using a 2 mV control signal may convey a feeling of sliminess to one user but a feeling of dampness to another. Accordingly, system 400 may be configured based on subjective opinion of the user.

In one embodiment, system 400 may account for lag or the time needed for the vortex generator 100 to discharge a vortex and for the vortex to travel to the object 450. For example, the display device 420 may transmit information to the computing device 410 associated with future events in the visual presentation 425. Based on the distance between vortex generator 100 and object 450, the tracking module 415 may determine the time needed for a vortex to reach the object 450. The computing device 410 may then send an instruction to the processing element 435 before the event occurs in the visual presentation 425 to account for this latency. In one embodiment, the latency may vary depending on the intensity of the vortex. Vortices with higher internal spin propagate through 3-D space quicker than vortices with slow internal spin. Thus, the computing device 410 may issue instructions for generating a low-intensity vortex earlier than is required if a high-intensity vortex is discharged from the vortex generator 100 to reach object 450 at the same time as an event occurs in the visual presentation 425.

The tracking module 415 may also account for the movement of the object 450. Because a vortex travels at a finite speed, the tracking module 415 may predict a future location of the object 450 in 3-D space and discharge the vortex to the predicted location. In one embodiment, the tracking module 415 may base the future movement based on the past movement of the object 450. For example, the tracking module 415 may generate a velocity vector based on the object's recent movements which the module 415 may then use to predict the location of the object 450 at some future time. Thus, if the event occurs in the visual presentation 425 in three seconds, the tracking module 415 may send instructions to the controller 430 such that the vortices corresponding to the event are directed to the future location of the object 450 in three seconds, not to the object's current location.

Moreover, the computing device 410 may adjust the intensity of the discharged vortex based on the distance between the object and the generator 100. That is, system 400 may be configured to provide uniform tactile sensations regardless of the objects 450 location in the 3-D space. For example, assume system 400 wants the discharge vortices that correspond to a soft breeze occurring in the visual presentation 425. Because the spin of the vortices reduces as it traverses through free space, the further the object 450 is from the vortex generator 100, the less force will be conveyed to the object 450 when struck by the vortices. Thus, if the vortex generator 100 issued the same vortices when the object 450 was half a meter away from the nozzle 115 as when the object 450 is two meters away, the tactile sensation will be different despite being associated with the same event—e.g., a soft breeze. The object 450 two meters away may experience a tactile sensation corresponding to a soft breeze but the object 450 half a meter away feel a sensation of a strong gust. Accordingly, when providing control signals to processing element 435, the tracking module 415 may determine the intensity of the vortex based on the distance between object 450 and nozzle 115 to provide more uniform tactile sensations.

Additional examples of using system 400 to provide tactile feedback associated with a visual presentation 425 will be provided later, but in general, system 400 tracks the location of object 450 relative to vortex generator 100 to provide tactile sensations corresponding to virtual objects or events in a visual presentation 425.

Figure 5:
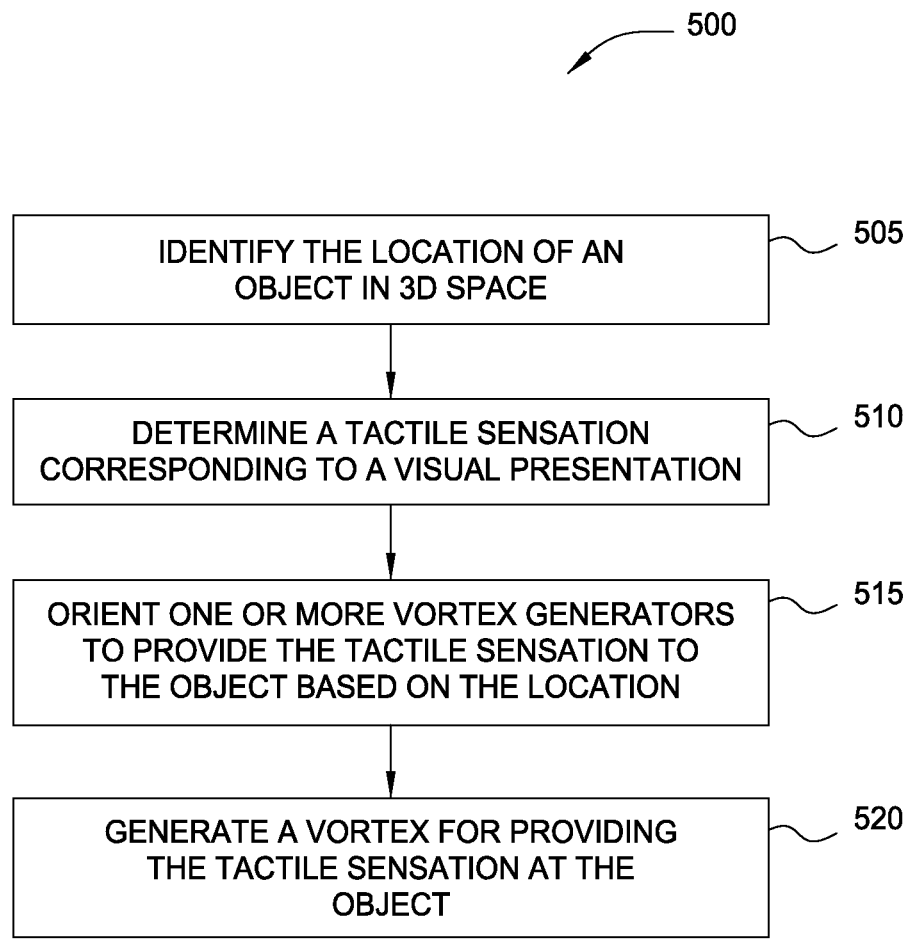
FIG. 5 illustrates a method for using vortices for providing tactile sensations, according to one embodiment described herein.

FIG. 5 illustrates a method 500 for using vortices for providing tactile sensations, according to one embodiment described herein. At block 505, a camera (e.g., a depth camera) associated with the vortex generator may transmit location data to the computing device. The location data may include location of different objects in the camera's view space and the distance from the objects to the camera. Based on this information, the computing device may track one or more the objects as it moves in the camera's view space.

The computing device may include a tracking module that uses an object recognition algorithm (e.g., a facial or gesture recognition program) for tracking the objects in the view space based on the location data. The embodiments discussed herein are not limited to any particular method or technique for identifying, distinguishing, and tracking the objects. For example, the tracking module may distinguish between different users based on a facial recognition tracking algorithm. In another example, the tracking module may use a technique for identifying movable objects (e.g., plants, curtains, and the like) that can be affected by vortices versus non-movable objects (e.g., a desk or couch) that are not moved when struck by vortices. When augmenting reality to correspond to a visual presentation, the system may direct vortices at the movable objects, but not at the non-moveable objects.

At block 510, the computing device determines a tactile or haptic sensation corresponding to a visual presentation. The visual presentation may be a single image or a video. For example, the tracking module may monitor the user's hand over a device displaying the visual presentation and select a different tactile sensation based on the location of the hand. If the user's hand is over a portion of the visual presentation that displays rocks, the vortex generator may produce vortices that convey a sense of roughness. However, if the user moves her hand to hover over a different portion displaying sand, the vortex generator may discharge vortices that convey a sense of grittiness. In another embodiment, if the visual presentation is a video, the display device may transmit information about different events to the computing device. The information may characterize the event as well as the time the event will take place in the visual presentation. Based on the current (or future) location of the object, the vortex generator discharges one or more vortices such that the vortices reach the object at the same time the event occurs in the visual presentation.

To provide the tactile sensation associated with the visual presentation, at block 515, the computing device transmits instructions or control signals to the controller that operates the vortex generator. The controller may translate the instructions into specific pan and tilt commands that move the flexible nozzle on the generator. In one embodiment, the pan and title commands may move the nozzle but not the rest of the components of the vortex generator. As discussed above, the nozzle may aim the vortices at an identified object based on the object's current location. However, if the object is moving, the nozzle may point to a predicted or future location of the object.

At block 520, the processing element in the controller may transmit signals to amplifiers that drive the actuators in the vortex generator. The actuators may decrease the volume of an internal chamber in the vortex generator which forces air out of the nozzle. This flowing air creates vortices which then propagate in the direction the nozzle is aimed. In one embodiment, the computing device or controller may account for the time needed for the vortex to travel from the generator to the object. For example, if the vortex is to provide a tactile sensation corresponding to the future event in the visual presentation, the computing device may determine the time required for a vortex to reach the object based on the distance from the object to the vortex generator and the particular propagation speed of the vortex (i.e., some vortices travel faster than others).

The tactile sensation may include one vortex or a plurality of vortices issued at a certain frequency. For example, the vortex generator may issue a single vortex that corresponds to a particular event or scene in the visual presentation. By changing the intensity of the vortex (i.e., the circular rotation or the amount of air in the vortex), the vortex generator can provide a different tactile sensation. For example, an explosion in the visual presentation may be associated with a vortex of greater intensity than a door being slammed shut. Moreover, the vortex generator may issue consecutive vortices at either a fixed frequency or in a predefined pattern. For example, a plurality of consecutive vortices with a set frequency and intensity may correspond to a particular texture while a predefined pattern of vortices that have different intensities and different timing between subsequent vortices may correspond to other events—e.g., a butterfly flapping its wings. In one embodiment, the computing device may adjust the frequency or intensity of the vortices based on the distance between the object and the vortex generator.

Figure 6:
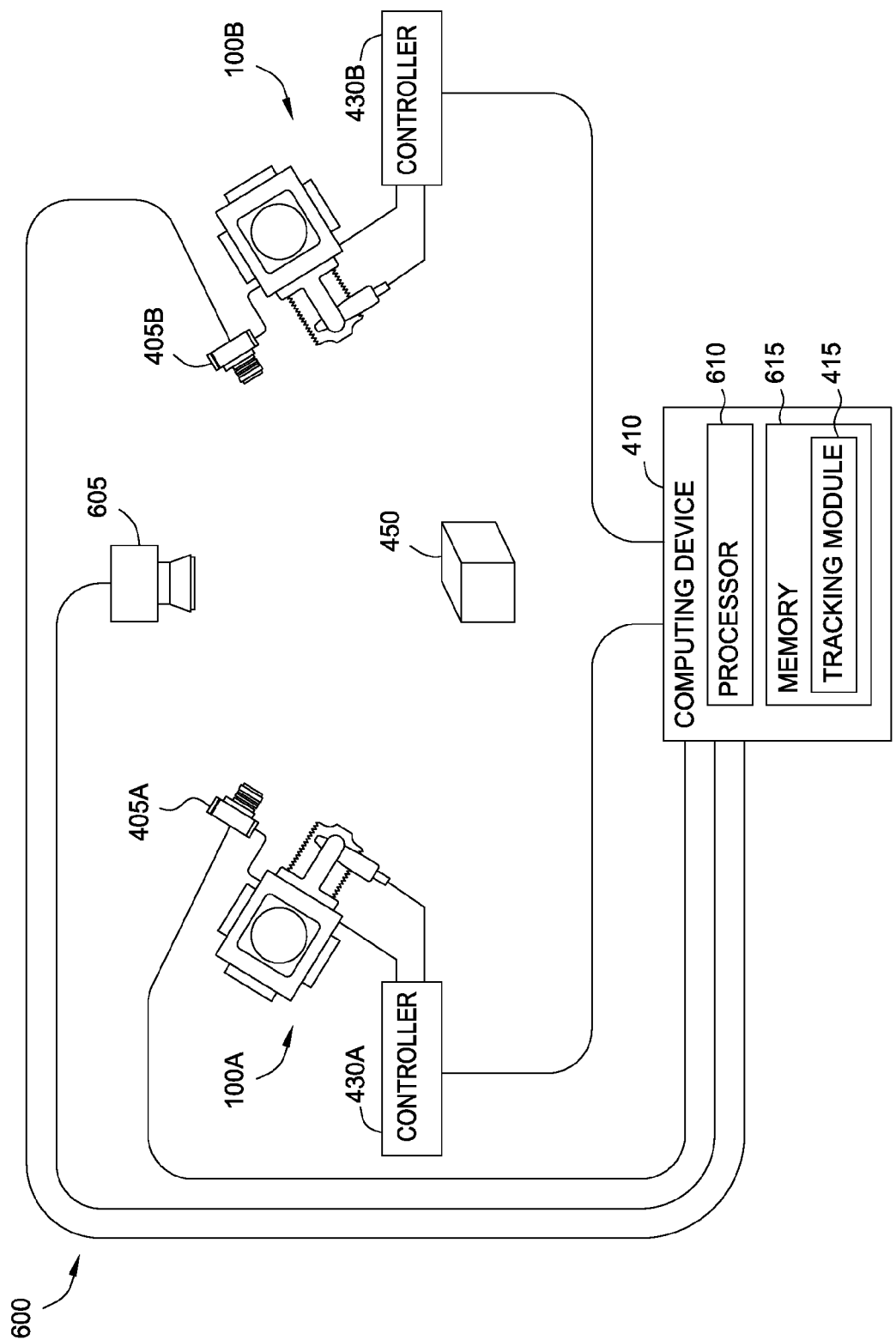
FIG. 6 illustrates a system for synchronizing multiple vortex generators for providing tactile sensations, according to one embodiment described herein.

FIG. 6 illustrates a system 600 for synchronizing multiple vortex generators 100A-B for providing tactile sensations, according to one embodiment described herein. System 600 differs from system 400 in FIG. 4 in that system 600 includes a scene camera 605 that enables the tracking module 415 to coordinate the different vortex generators 100A-B to provide tactile sensations to object 450. For example, the scene camera 605 may be depth camera that measures the distance between itself and the objects in the real-world environment. In one embodiment, the scene camera 605 and the local cameras 405A and 405B may all be depth cameras although the scene camera 605 may have a greater range than the local cameras 405A and 405B.

The scene camera 605 may provide a more accurate 3-D location of the object 450 when compared to only using the local cameras 405A-B mounted on the vortex generators 100A-B. The scene camera 605 may be mounted on top of a ceiling or near the top of a wall to maximize its viewing area. The scene camera 605 and the local cameras 405 may be calibrated to create a unified coordinate system. During the calibration process, the different locations captured by the respective cameras 605, 405 are correlated such that location data provided by each camera 605, 405 can be combined to identify the object's location in 3-D space. Using the location data provided from the cameras 605 and 405 to determine the object's location in a unified coordinate system may provide a more accurate distance measurement between the vortex generators 100A and 100B and object 450. The distance measurement may then be used to determine the latency between the respective vortex generators 100A-B and the object 450. For example, assume the visual presentation is a game where the user (i.e., object 450) is playing the game in first-person mode. If a bird circles the user's head, vortex generator 100A may provide the tacticle sensation of a bird flapping its wings near the right side of the user's head but vortex generator 100B may take over the responsibility for simulating the bird flying near the left side of the user's head. To coordinate the tactile sensation of this event, system 600 uses the accurate distance and latency measurement provided by combining the location data from scene camera 605 with the local cameras 405A-B to correlate the object's location to a unified coordinate system.

In addition, the respective controllers 430A and 430B are coupled to the same computing device 410 and may receive instructions from the same tracking module 415. Returning the example provided above, the tracking module 415 may include the logic for determining when to switch from using vortex generator 100A to using vortex generator 100B. Here, tracking module 415 is an application loaded into memory 615 and is executed by processor 610 which may be any processor capable of performing the functions recited herein.

In one embodiment, tracking module 415 may use the vortex generators 100 to extend the visual presentation to physical objects in the surrounding environment. For example, if the visual presentation displays a beach with a gentle breeze, system 600 may use the cameras 605 and 405 to identify movable objects 450 in the physical environment—e.g., plants, curtains, and the like. The tracking module 415 may then instruct the vortex generators 100 to direct their vortices at the identified objects 450 to simulate an ocean breeze. In another example, system 600 may be combined or linked with a surround sound system that provides multi-directional sounds to the user. If the sound system generates the sound of an animal moving to the side of the user viewing the visual presentation, the tracking module 415 may instruct one (or both) of the vortex generators 100 to discharge vortices at a moveable object 450 near the speaker generating the noise to simulate an animal moving the object 450. In this manner, system 600 may use multiple vortex generators 100 simultaneously or independently to provide directional feedback that corresponds to a visual presentation.

Figure 7:
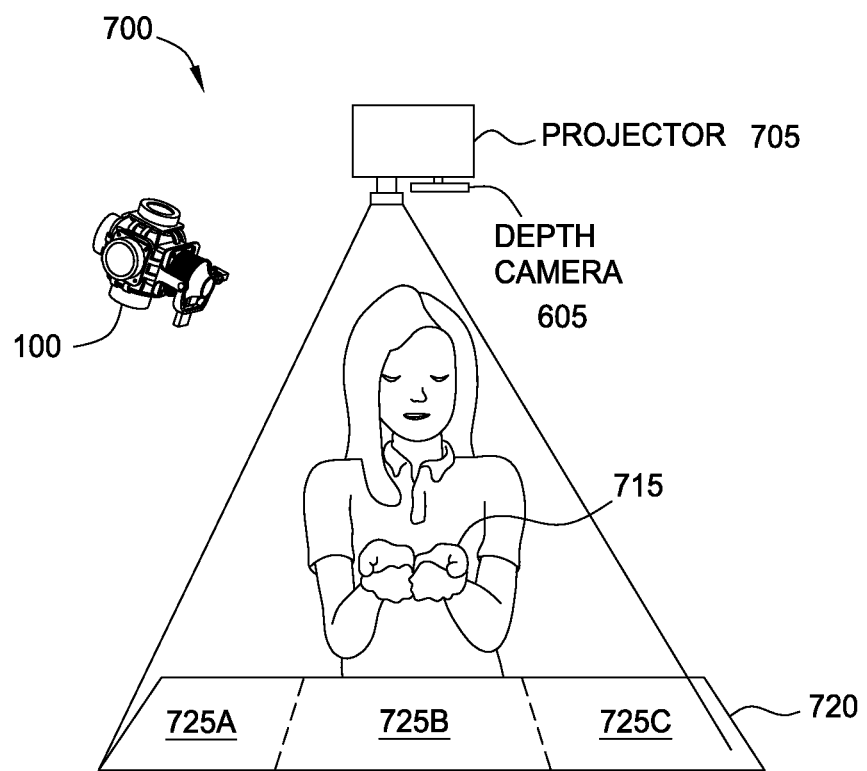
FIG. 7 illustrates a system for integrating a vortex generator with a projection of a visual presentation, according to one embodiment described herein.

FIG. 7 illustrates a system 700 for integrating a vortex generator 100 with a projection of a visual presentation, according to one embodiment described herein. System 700 includes a display device—i.e., projector 705—which includes an integrated depth camera 605 which is mounted separately from the vortex generator 100. Although not shown, system 700 may include a tracking module and controller for receiving the location data provided by camera 605 and providing instructions to the vortex generator 100. Here, system 700 tracks the location of the user's hands 715. Specifically, based on the information provided by camera 605, the tracking module determines what area of the projected image 720 the hands 715 are located.

Projector 705 may project an image that includes different portions 725A-C. These portions may display images of different objects that may have different textures—e.g., sand, rocks, water, etc. Based on the location of hand 715, the vortex generator provides a different tactile sensation. That is, as the user moves her hand 715 to overlap a different portion 725, this movement is detected by camera 605 and used to select a different tactile sensation. In addition to tracking the hand 715 to select the tactile sensation, the location of the hand is used to adjust the direction the nozzle of the vortex generator 100 is aiming. Thus, as the user moves her hands 715 from portion 725B such that it now overlaps portion 725C (i.e., the image displayed in portion 725C is displayed on the user's hands 715), the vortex generator 100 may adjust the pan and tilt controllers to discharge vortices to the new location of the hands 715. Because the texture of the object or objects displayed in portion 725C are different than the objects displayed in portion 725B, the vortex generator 100 discharges a vortex or a series of vortices that provide a tactile sensation corresponding to the objects displayed in portion 725C.

The visual presentation displayed in area 720 may either be a single image or a video. For example, the different portions 725 may correspond to three different textures and respective tactile sensations that change as the user moves her hand 715 to a new portion 725. Alternatively, if the visual presentation is a video, the tactile sensation may change even if the location of the hand 715 remains fixed. For example, portion 725B may display a butterfly flapping its wings in the users cupped hands. As the wings beat, the vortex generator 100 may provide vortices with different intensities or frequency to simulate the air moved by the flapping wings—i.e., the tactile sensation changes relative to time to correspond to the changing event. In this example, for user to feel the tactile sensation associated with the flapping wings, the vortex generator 100 may discharge the vortices early to account for the latency between the time needed for the projected image to reach the user's hands 715 (i.e., the speed of light) and the time needed for the vortex to reach hands 715. Because the down beat of the wings may cause a different tactile sensation than when the wings are lifted up, the respective tactile sensations may be provided before the corresponding image is ever displayed on the user's hands 715. By accounting for this latency, once the action is displayed on hands 715, the associated vortex or series of vortices may arrive in synch with the image.

System 700 may be calibrated such that a location and depth of the user's hand 715 corresponds to a particular pan and title on the nozzle controllers on vortex generator 100. Thus, once the hand 715 is identified, its corresponding location relative to the camera 605 may be directly mapped to controls that aim the nozzle at the hand 715. In addition, detecting the location of the hand 715 in 3-D space enables the tracking module to determine what portion 725 of the visual presentation is illuminated on the hand 715. Based on this information, system 700 is able to determine what tactile sensation to provide. In other embodiments, additional cameras (e.g., a local camera mount on the vortex generator) may be added to system 700.

Figure 8:
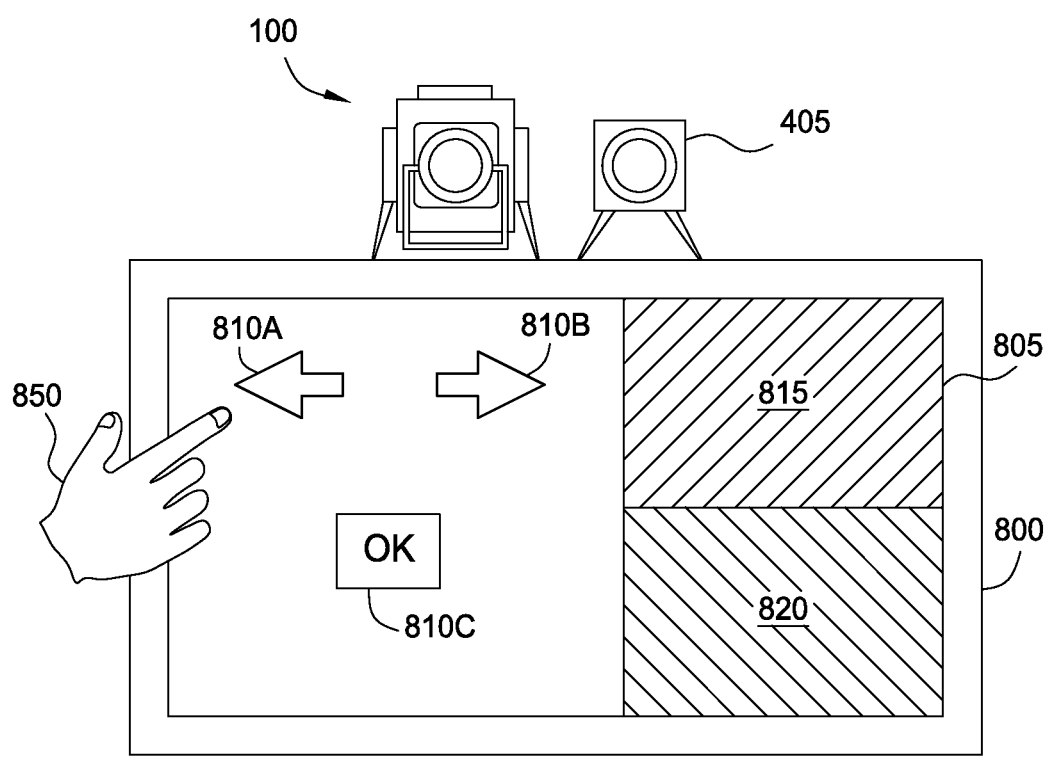
FIG. 8 illustrates a system diagram for providing tactile feedback based on a visual presentation on a display device, according to one embodiment described herein.

FIG. 8 illustrates a system diagram for providing tactile sensations based on a visual presentation on a display device 800, according to one embodiment described herein. Display device 800 may be a television, computer monitor, tablet, smartphone, laptop, and the like. Vortex generator 100 and depth camera 405 may be mounted on the display device 800 such that changing the orientation of device 800 does not change the position of the vortex generator 100 relative to the position of the display device 800—i.e., the display device 800, vortex generator 100, and camera 405 move together as a single unit.

In one embodiment, the display device 800 may be a computing device executing the tracking module shown in FIG. 4 that uses location data provided by camera 405 to provide tactile sensations to the user's hand 850. For example, device 800 may be a tablet, smartphone, laptop, desktop computer, or other computing device that includes a processor and memory for executing the tracking module. Thus, FIG. 8 represents an embodiment where the computing device 410, display device 420, and even the controller 430 of FIG. 4 may be integrated into a single component. In one embodiment, the display device 800 may also provide power to the vortex generator 100 and camera 405.

The display device 800 may use the scene information captured by camera 405 to track the user's hand 850 relative to the different portions of the display screen 805. For example, the left side of screen 805 includes a plurality of displayed buttons 810A-C. Unlike physical buttons, buttons 810 are displayed on the screen 805, and thus, can easily be rearranged or removed such that other objects can be displayed on screen 805. Using the vortex generator 100 and camera 405, the user can interact with the buttons. For example, the display screen 805 may not include touch sensors integrated into screen 805 that allows a user to interact with the displayed buttons 810. Instead, device 800 may use the data provided by camera 405 to determine when the user is interacting with the buttons 810. For example, when the tacking module in device 800 determines that hand 850 is hovering over a location of the screen 805 corresponding to a button 810 (e.g., the user holds her hand 850 such that it overlaps at least a portion of a button 810 for a predefined period of time), the device 800 may perform the action associated with the button 810 such as scrolling a screen, turning a page in an electronic book, starting or stopping media content, and the like. The vortex generator 100 may be used to provide tactile feedback to inform the user that the button 810 was selected. That is, instead of solely relying on a change in the information displayed on the screen 805 to indicate when a button 810 is activated, the vortex generator 100 may discharge a vortex that strikes the user's hand 850 thereby letting the user know the button 810 was activated. If, for example, button 810C is activated by "double-clicking"—i.e., performing two tapping motions by a finger of hand 850, once each tapping gesture is detected by the tracking module, the vortex generator 100 may discharge two respective vortices to inform the user that the double tap was registered by the device 800.

In another embodiment, the vortex generator 100 may discharge vortices to inform the user that she is about to activate a button 810. For example, as the user moves closer to a button 810, the vortex generator 100 may increase the intensity of the vortices being discharged. As the user moves her hand 850 away from the buttons 810, the intensity may be decreased. Doing so informs the user how close she is to activating the button as well as prevents the user from inadvertently activating the buttons 810.

The right side of screen 805 is divided into two portions: upper portion 815 and lower portion 820. Each portion 815, 820 may display a different object or objects that correspond to respective tactile sensations. Accordingly, as the camera 405 determines that the hand 850 has moved over the respective portions 815, 820, the device 800 instructs the vortex generator 100 to discharge vortices that convey the appropriate tactile sensation at the hand 850. In this manner, the user can "feel" the scene being displayed on the screen 805 without contacting the screen 805. For example, upper portion 815 may include a structure where the vortex generator 100 provides vortices that correspond to the structure's contours or texture while lower portion 820 may be the landscape scene where the user can feel the different textures of the land (e.g., rocks, sand, water, etc.) surrounding the structure shown in upper portion 815.

CONCLUSION

To convey tactile sensations over an open space, a system may use a vortex generator to direct one or more vortices at an object in 3-D space. As used herein, a vortex is a ring (or torus) of air that travels through space. Once the vortex strikes an object—e.g., a user's hand—it applies a force. The vortex generator can control the frequency and intensity of the vortices in order to provide different tactile sensations that correspond to a visual presentation. The vortices may augment the real-world environment to immerse the user in the visual presentation. For example, the visual presentation may be a movie or a video game where the affects of an explosion are transferred to the real-world environment by the vortices hitting the user or other physical objects around the user. In another example, the vortex generator may change the frequency or intensity of the vortices to provide different tactile sensations. Depending on the location of the user's hand in front of a display screen, the vortex generator may produce vortices that convey a different sensation. For example, if the user's hand is over a portion of a screen displaying water, the vortices may provide a feeling of dampness, but if the hand is over a portion of the display screen displaying a rocky surface, the vortex may change the frequency or intensity at which the vortices are discharged to convey a bumpy feeling.

The vortex generator may include a flexible nozzle with one or more gimbal controls that enable the generator to discharge a vortex at a particular 3-D location in space. A controller may synchronize the vortex generator to the visual presentation such that the vortex reaches the object at the same time a particular event occurs in the visual presentation. That is, the controller may account for the delay needed for the vortex to travel to the desired location. As such, the controller may receive data from a tracking application that uses one or more cameras to track the location of the object in order to accurately aim the nozzle of the vortex generator and determine the time required for a vortex to reach the object. In this manner, the vortex generator may be synchronized to a visual presentation in order to provide tactile feedback.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and flowchart illustration, and combinations of blocks in the block diagrams and flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method for augmenting reality based on a visual presentation, the method comprising:
    identifying the location of a physical object based on data captured from a sensing device;
    orienting a vortex generator based on the identified location of the physical object;
    determining a tactile sensation corresponding to at least one of a virtual object in the visual presentation and an event in the visual presentation;
    selecting a predefined pattern of sequential vortices for conveying the tactile sensation upon striking the physical object, the predefined pattern defining one or more frequencies for discharging the sequential vortices and one or more intensities of the sequential vortices; and
    after orienting the vortex generator, discharging the sequential vortices from the vortex generator using the predefined pattern.

2. The method of claim 1, wherein the predefined pattern of sequential vortices provide the tactile sensation corresponding to a texture of the virtual object when striking the physical object.

3. The method of claim 1, further comprising:
    determining a time delay between the event in the visual presentation and the time required for the vortex to strike the physical object, wherein the vortex is discharged from the vortex generator to account for the time delay.

4. The method of claim 1, further comprising:
    adjusting an intensity of the vortex based on a measured distance from the vortex generator to the physical object such that a substantial similar tactile sensation is provided to the physical object regardless of the distance between the physical object and the vortex generator.

5. The method of claim 1, wherein orienting the vortex generator further comprises:
   determining a direction of movement of the physical object; and
   orienting the vortex generator to discharge the vortex at a predicted, future location of the physical object.

6. A computer program product for augmenting reality based on a visual presentation, the computer program product comprising:
   a computer-readable storage medium having computer-readable program code embodied therewith, the computer-readable program code configured to:
      identify the location of a physical object based on data captured from a sensing device;
      orient a vortex generator based on the identified location of the physical object;
      determine a tactile sensation corresponding to at least one of a virtual object in the visual presentation and an event in the visual presentation;
      select a predefined pattern of sequential vortices for conveying the tactile sensation upon striking the physical object, the predefined pattern defining one or more frequencies for discharging the sequential vortices and one or more intensities of the sequential vortices; and
      after orienting the vortex generator, discharge the sequential vortices from the vortex generator using the predefined pattern.

7. The computer program product of claim 6, wherein the predefined pattern of sequential vortices provide the tactile sensation corresponding to a texture of the virtual object when striking the physical object.

8. The computer program product of claim 6, further comprising computer-readable program code configured to:
   determine a time delay between the event in the visual presentation and the time required for the vortex to strike the physical object, wherein the vortex is discharged from the vortex generator to account for the time delay.

9. The computer program product of claim 6, further comprising computer-readable program code configured to:
   adjusting an intensity of the vortex based on a measured distance from the vortex generator to the physical object such that a substantial similar tactile sensation is provided to the physical object regardless of the distance between the physical object and the vortex generator.

10. The computer program product of claim 6, wherein orienting the vortex generator further comprises computer-readable program code configured to:
   determine a direction of movement of the physical object; and
   orient the vortex generator to discharge the vortex at a predicted, future location of the physical object.

11. A system, comprising:
   a sensing device;
   a vortex generator configured to discharge a vortex, the vortex generator comprising adjusters configured to change an orientation of the vortex generator; and
   a computing device communicatively coupled to the sensing device and the vortex generator, the computing device configured to:
      identify the location of a physical object based on data captured from the sensing device;
      orient the vortex generator based on the identified location of the physical object;
      determine a tactile sensation corresponding to at least one of a virtual object in the visual presentation and an event in the visual presentation;
      selecting a predefined pattern of sequential vortices for conveying the tactile sensation upon striking the physical object, the predefined pattern defining one or more frequencies for discharging the sequential vortices and one or more intensities for the sequential vortices; and
      after orienting the vortex generator, discharge the sequential vortices from the vortex generator using the predefined pattern.

12. The system of claim 11, wherein the sensing device is fixable mounted such that a position of the vortex generator relative to a position of the sensing device remains constant as the vortex generator is moved.

13. The system of claim 12, further comprising a depth sensor, wherein the computing device is configured to use data captured by the sensing device and the depth sensor to identify the location of the physical object in 3-D space.

14. The system of claim 11, wherein the computing device is configured to orient the vortex generator by transmitting instructions to the adjusters such that a nozzle of the vortex generator is moved.

15. The system of claim 11, further comprising:
   a display device configured to display the visual presentation, wherein the display device is communicatively coupled to the computing device to provide the computing device with information associated with at least one of the virtual object in the visual presentation and the event in the visual presentation.

16. The system of claim 15, wherein the display device and the computing device are integrated to form a unified device, wherein the vortex generator and sensing device are mounted onto the unified device.

17. A vortex generator comprising:
   a body enclosing a central cavity;
   an actuator mounted onto the body, the actuator configured to change the volume of the central cavity in response to a first control signal;
   a flexible, elongated nozzle attached to the body at a first end, wherein, in response to the actuator changing the volume of the central cavity, air flows through the nozzle and generates a vortex at a second end of the nozzle opposite the first end; and
   an adjustment element coupled to the nozzle, the adjustment element is configured to, in response to a second control signal, adjust the position of the second end of the nozzle relative to the first end of the nozzle thereby changing the direction the vortex travels.

18. The vortex generator of claim 17, wherein the adjustment element moves the second end of the nozzle relative to the body, such that the adjustment element does not move the body when adjusting the second end of the nozzle.

19. The vortex generator of claim 17, wherein the adjustment element is a first gimbal controller that moves the second end of the nozzle along a first axis, wherein the vortex generator further comprises a second gimbal controller that adjusts the second end of the nozzle along a second axis perpendicular to the first axis.

* * * * *